United States Patent
Hassan

(10) Patent No.: US 9,895,763 B2
(45) Date of Patent: Feb. 20, 2018

(54) NOZZLE INSERT FOR AN ARC WELDING APPARATUS

(71) Applicant: Victor Equipment Company, Denton, TX (US)

(72) Inventor: Khalid Hassan, Denton, TX (US)

(73) Assignee: Victor Equipment Company, Denton, TX (US)

( * ) Notice: Subject to any disclaimer, the term of this patent is extended or adjusted under 35 U.S.C. 154(b) by 158 days.

(21) Appl. No.: 14/541,069

(22) Filed: Nov. 13, 2014

(65) Prior Publication Data
US 2015/0129571 A1 May 14, 2015

Related U.S. Application Data

(60) Provisional application No. 61/903,950, filed on Nov. 13, 2013, provisional application No. 62/053,784, filed on Sep. 22, 2014.

(51) Int. Cl.
*B23K 9/16* (2006.01)
*B23K 9/28* (2006.01)
(Continued)

(52) U.S. Cl.
CPC .............. *B23K 9/295* (2013.01); *B21D 19/00* (2013.01); *B23K 9/173* (2013.01); *B23K 9/285* (2013.01); *B23K 9/32* (2013.01)

(58) Field of Classification Search
CPC . B23K 9/29; B23K 9/32; B23K 9/173; B23K 9/285; B23K 9/287; B23K 9/291; B23K 9/295; B23K 9/164; B21D 19/00
(Continued)

(56) References Cited

U.S. PATENT DOCUMENTS 1,828,459 A 10/1931 Cornell et al.
1,835,179 A 12/1931 Rue et al.
(Continued)

FOREIGN PATENT DOCUMENTS

CN 201902729 U 7/2011
DE 231519 A1 1/1986
(Continued)

OTHER PUBLICATIONS

International Search Report and Written Opinion dated Feb. 29, 2016 for PCT/US2015/060377 filed Nov. 12, 2015.
(Continued)

*Primary Examiner* — Michael Hoang
(74) *Attorney, Agent, or Firm* — Edell, Shapiro & Finnan, LLC

(57) ABSTRACT

A consumable assembly for use in an arc welding apparatus is provided that includes a nozzle assembly having a nozzle body, an insulator disposed within the nozzle body, and a nozzle insert disposed within the insulator. The nozzle insert includes an internal gas diverter. A contact tip is disposed within the nozzle assembly and includes at least one aperture extending from an exterior portion to an internal cavity, an exit orifice, a distal end face, and an exterior surface extending between the at least one aperture and the distal end portion of the contact tip. The internal gas diverter directs a flow of shield gas exiting the at least one aperture along the exterior surface of the contact tip.

15 Claims, 6 Drawing Sheets

(51) Int. Cl.
*B23K 9/12* (2006.01)
*B23K 9/32* (2006.01)
*B23K 9/29* (2006.01)
*B23K 9/173* (2006.01)
*B21D 19/00* (2006.01)

(58) Field of Classification Search
USPC ............ 219/137.42, 137.31, 137.44, 137.61, 219/137.62, 137.63
See application file for complete search history.

(56) References Cited

U.S. PATENT DOCUMENTS

| | | | |
|---|---|---|---|
| 2,432,639 | A | 12/1947 | Webster et al. |
| 2,438,292 | A | 3/1948 | Linker et al. |
| 3,018,360 | A | 1/1962 | Engel et al. |
| 3,629,547 | A | 12/1971 | Kester et al. |
| 4,105,891 | A | 8/1978 | Hill et al. |
| 4,158,765 | A | 6/1979 | Moerke |
| 4,467,175 | A | 8/1984 | Reeh et al. |
| 4,554,432 | A * | 11/1985 | Raloff .................. B23K 9/295 219/137.43 |
| 5,669,556 | A | 9/1997 | Yoshida |
| 7,905,741 | B1 | 3/2011 | Wade et al. |
| 2004/0026394 | A1 | 2/2004 | Giese |
| 2005/0109738 | A1 | 5/2005 | Hewett et al. |
| 2007/0062922 | A1 | 3/2007 | Zamuner |
| 2007/0210049 | A1 | 9/2007 | Dingeldein |
| 2007/0215587 | A1* | 9/2007 | Centner ................ B23K 9/295 219/137.62 |
| 2008/0035626 | A1 | 2/2008 | Christopher et al. |
| 2008/0188093 | A1 | 8/2008 | Jaeger |
| 2008/0290074 | A1 | 11/2008 | Speker et al. |
| 2009/0050609 | A1 | 2/2009 | Berger et al. |
| 2011/0000893 | A1 | 1/2011 | Blankenship et al. |
| 2013/0134143 | A1 | 5/2013 | Hassan et al. |
| 2014/0263253 | A1 | 9/2014 | Meess et al. |

FOREIGN PATENT DOCUMENTS

| | | |
|---|---|---|
| JP | S60-71482 U | 5/1985 |
| JP | S60-170574 A | 9/1985 |
| JP | H07256462 A | 10/1995 |
| JP | 2004276084 A | 10/2004 |
| JP | 2004-322127 A | 11/2004 |
| JP | 2009-142850 A | 7/2009 |
| KR | 2012-0000369 U | 1/2012 |
| KR | 2012-0081460 A | 7/2012 |
| WO | 2013157036 A1 | 10/2013 |

OTHER PUBLICATIONS

International Search Report and Written Opinion dated Apr. 14, 2015 for International Application No. PCT/US2014/065577 filed Nov. 13, 2014.

International Search Report and Written Opinion dated Apr. 1, 2015 for International Application No. PCT/US2014065353 filed Nov. 13, 2014.

International Search Report and Written Opinion dated Apr. 1, 2015 for International Application No. PCT/US2014/065566 filed Nov. 13, 2015.

International Search Report and Written Opinion dated Mar. 18, 2015 for International Application No. PCT/US2015/065340 filed Nov. 13, 2014.

International Search Report and Written Opinion dated Apr. 1, 2015 for International Application No. PCT/US2014/065351 filed Nov. 13, 2014.

International Search Report and Written Opinion dated Mar. 6, 2015 for International Application No. PCT/US2014/065504 filed Nov. 13, 2014.

International Search Report and Written Opinion dated Mar. 25, 2015 for International Application No. PCT/US2014/065346 filed Nov. 13, 2014.

International Search Report and Written Opinion dated Apr. 1, 2015 for International Application No. PCT/US2014/065487 filed Nov. 13, 2014.

Canadian Office Action from corresponding Canadian Application No. 2,928,864 dated Mar. 27, 2017 (4 pages).

* cited by examiner

NOZZLE INSERT FOR AN ARC WELDING APPARATUS

CROSS-REFERENCE TO RELATED APPLICATIONS

This application claims the benefit of U.S. provisional application Ser. Nos. 61/903,950 filed on Nov. 13, 2013 and 62/053,784 filed on Sep. 22, 2014. The disclosures of the above applications are incorporated herein by reference in its entirety.

FIELD

The present disclosure relates generally to welding apparatuses, and more particularly to arc welding apparatuses such as Metal Inert Gas (MIG) or Gas Metal Arc Welding (GMAW) welding guns, including consumables for generating a welding arc and diffusing a shield gas.

BACKGROUND

The statements in this section merely provide background information related to the present disclosure and may not constitute prior art.

In an arc welding apparatus, such as Metal Inert Gas (MIG) or Gas Metal Arc Welding (GMAW) welding gun, a welding wire is fed through the welding gun to provide a molten metal pool to join metal workpieces together. An inert gas is directed through the front (distal) end of the welding gun to provide a surrounding layer or blanket of shield gas to protect the molten metal pool from atmospheric contamination. The inert gas is typically a combination of various gases such as argon or helium, among others.

A prior art MIG or GMAW welding gun typically includes a contact tip and a gas diffuser connected to the contact tip. The contact tip has a central bore to guide the welding wire to the workpieces. The contact tip transfers electrical current to the welding wire. The gas diffuser is typically threaded to the contact tip and defines gas passageways that direct the shield gas into a blanket of shield gas around the molten metal pool. The contact tip and gas diffuser are constantly subjected to high heat and are susceptible to wear due to high temperature operation.

SUMMARY

The present disclosure generally provides a contact tip/diffuser configuration for an arc welding apparatus, such as an MIG or GMAW welding gun with an increased consumable life. The various forms of the present disclosure provide a simplified structure, more uniform heat distribution and improved cooling to increase consumable life, among other benefits.

In one form, a nozzle insert is used in a welding torch to secure a contact tip to a conductor tube. The nozzle insert comprises a body defining a longitudinal axis having a proximal end portion, a distal end portion. The body has a central bore that extends from the proximal end portion towards the distal end portion. The nozzle insert includes an internal gas diverter disposed near the distal end portion of the body. The internal gas diverter defines a seating surface toward the proximal end portion and a profiled diverter orifice extends distally from the central bore.

In another form, an arc welding apparatus comprises a handle. A conductor tube is attached to the handle and a welding cable is connected to the handle. The welding cable carries welding current, shield gas and welding wire from a power source to the handle. A consumable assembly is attached to the conductor tube. The consumable assembly comprises a nozzle assembly. The nozzle assembly includes a nozzle body, an insulator disposed within the nozzle body, and a nozzle insert disposed within the insulator. The nozzle insert comprises an internal gas diverter and a seating surface. A contact tip is disposed within the nozzle assembly. The contact tip defines a shoulder that engages the seating surface of the nozzle insert. The contact tip comprising at least one aperture extending from an exterior portion into an internal cavity of the contact tip. The internal gas diverter directs a flow of shield gas exiting the aperture of the contact tip.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
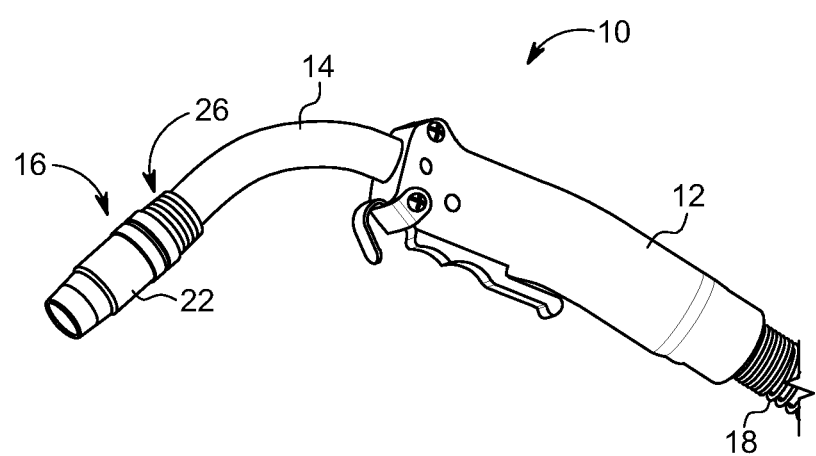
FIG. 1 is a perspective view of an arc welding apparatus constructed in accordance with the teachings of the present disclosure.

The following description is merely exemplary in nature and is in no way intended to limit the present disclosure or its application or uses. It should be understood that throughout the description and drawings, corresponding reference numerals indicate like or corresponding parts and features. And although the term "MIG" or "GMAW" is used throughout the specification, it should be understood that the teachings of the present disclosure apply to any type of welding or cutting apparatus.

Referring to FIG. 1, an arc welding apparatus, such as a MIG or GMAW welding gun, is illustrated and generally indicated by reference numeral 10. The MIG welding gun 10 includes a handle 12, a conductor tube 14 attached to the handle 12, and a consumable assembly 16 attached to the conductor tube 14. The handle 12 is connected to a welding cable 18 that carries welding current, shield gas, and a welding wire 20 from a power source (not shown), a gas source (not shown), and a wire feeder (not shown) to the welding gun 10.

The consumable assembly 16 includes a plurality of consumable components including a nozzle assembly 22 and a contact tip 24 (contact tip 24 is shown in latter FIGS.). The structure and operation of an exemplary arc welding apparatus has been disclosed in U.S. Pat. Nos. 5,491,321 and 5,338,917, which are commonly owned by the assignee of the present application, and the contents of which are incorporated herein by reference in their entirety.

The consumable assembly 16 is connected to a distal end portion 26 of the conductor tube 14. The nozzle assembly 22 is substantially cylindrical in one form and receives the distal end portion 26 of the conductor tube 14 therein. The contact tip 24 is coaxially disposed inside the nozzle insert 22 and may be secured therein as illustrated and described in copending U.S. application Ser. No. 13/674,829 titled "Hollow Contact Tip-Diffuser for GMAW Manual/Robotic Arc Welding MIG Guns," which is commonly owned with the present application and hereby incorporated by reference in its entirety. Further construction and operation of an exemplary arc welding apparatus for which the teachings of present disclosure may be applied are also described in greater detail in the aforementioned copending application.

Figure 2A:
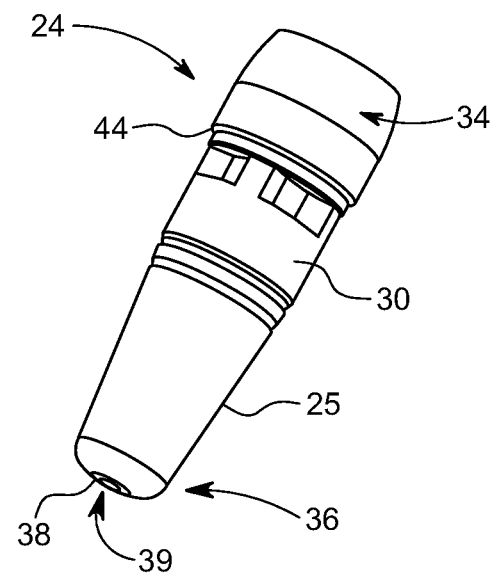
FIG. 2A is a front perspective view of a contact tip constructed in accordance with the teachings of the present disclosure.
Figure 2B:
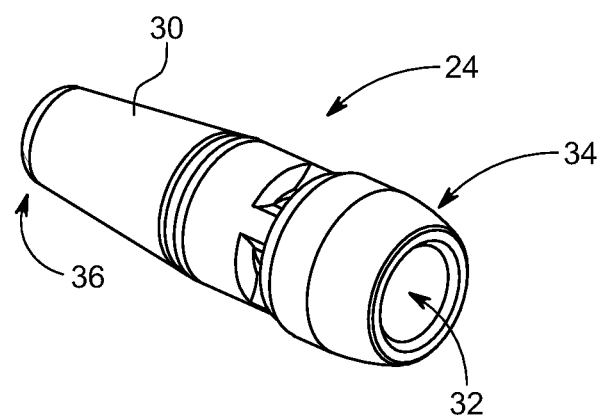
FIG. 2B is a rear perspective view of a contact tip constructed in accordance with the teachings of the present disclosure.
Figure 3:
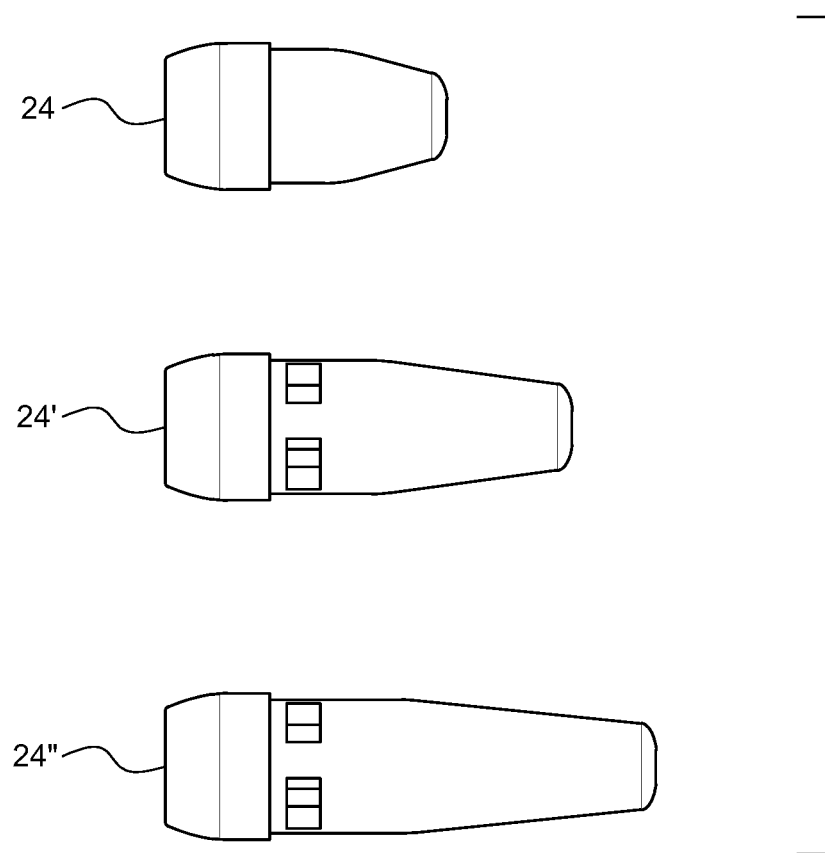
FIG. 3 is a side view of various forms of the contact tip constructed in accordance with the teachings of the present disclosure.

Referring to FIGS. 2-4, various forms of the contact tip 24 according to the present disclosure are now illustrated and described in greater detail. The contact tip 24 has a body 30 that defines an internal cavity 32 extending from a proximal end portion 34 to a distal end portion 36. The contact tip 24 has a distal end face 38 and an exit orifice 39 that extends through the distal end portion 36 of the body 30 and the distal end face 38. Advantageously, the contact tip 24 is designed to function as both a contact tip for transferring electric current to the welding wire and a gas diffuser for diffusing shield gas around the molten metal pool, thus providing a dual function while eliminating an additional component (i.e., a separate gas diffuser) from the consumable assembly 16.

As shown in FIG. 3, the length and configuration of the contact tips 24 can vary depending on application parameters such as amperage, wire diameter, duration of a welding operation, operating temperature, among other parameters associated with the environmental and specific welding application and welding process such as, by way of example, short arc, globular, spray transfer, and pulse. In addition, the length and configuration of the contact tips 24 may provide for customizing and improving the flow of shield gas and cooling of the contact tip 24 along with the surrounding nozzle assembly 22 for a specific welding operation. As shown, a shorter contact tip 24 is used for example in a light duty application, the contact tip in the center 24' for a medium duty application, and the contact tip at the bottom 24", for a heavy duty application. Typically, the duty cycle is determined by the duration of the weld operation and the amperage used during continuous operation of the welding gun. For example, a light duty application may be considered to be those welding operations that are rated and use approximately 250 amperes and below. A medium duty application may be considered to be welding operations with a range from approximately 250 amperes to approximately 350 amperes, and a heavy duty application is generally 350 amperes and above.

Figure 4A:
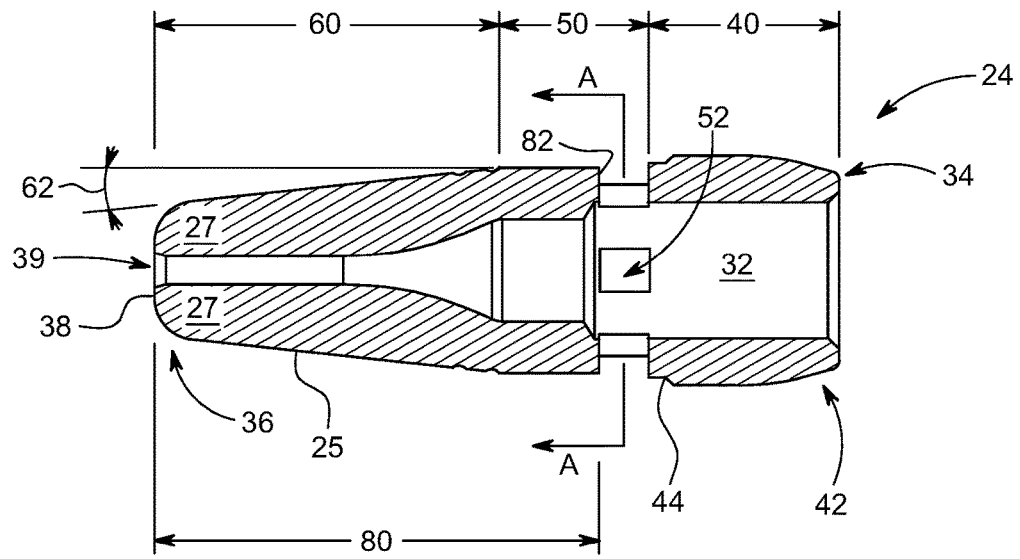
FIG. 4A is a side cross-sectional view of the contact tip constructed in accordance with the teachings of the present disclosure.

Referring now to FIG. 4A, the contact tip 24 according to one form of the present disclosure is further defined as having three sections, 40, 50, and 60. The first section 40 includes a spherical tapered end portion 42 for engaging a corresponding spherical tapered seat of a conductor tube (set forth above). Although a spherical taper geometry is shown, various other geometries may be used such as tapered or polygonal configuration for the contact connection between the contact tip 24 and a corresponding component such as a conductor tube. The spherical tapered end 42 tapers outward from the proximal end 34 toward the distal end portion 36. The first section 40 also defines a shoulder 44 as shown. The second section 50 is generally cylindrical and in one form defines at least one aperture 52 that extends through the body 30 into the internal cavity 32. Although the aperture 52 is shown in a rectangular/slotted configuration, it should be understood that any geometrical shape, such as by way of example, round, oval, polygonal may be employed while remaining within the scope of the present disclosure. Additionally, the apertures 52 may be normal to an outer surface 25 of the contact tip 24 or the apertures 52 may be angled in order to introduce a swirling action to the shield gas while remaining within the scope of the present disclosure. Additional details and function of the apertures 52 are set forth in copending U.S. application Ser. No. 13/674,829 titled "Hollow Contact Tip-Diffuser for GMAW Manual/Robotic Arc Welding MIG Guns," which has been incorporated by reference herein above.

A third section 60 in one form is tapered, and more specifically, tapering at an angle inward towards the distal end face 38 as shown. The third section 60 in this form tapers distally at a taper angle 62 from the second section 50 to the distal end face 38. The third section 60 may further include variations to the taper angle 62 to accommodate application variables such as the diameter of the exit orifice 39 of the contact tip 24 or a diameter of welding wire. By way of example, in one form of the present disclosure, the taper angle 62 varies between approximately 0-10 degrees. It should be understood that the length and/or configuration of each section 40, 50, 60 of the contact tip 24 may vary according to the specific welding application, such as by way of example, an extended tapered section 60 for reach small/tight welding locations, or a constant diameter contact tip throughout the second and third sections, 50, 60.

As previously set forth, the contact tip 24 includes at least one aperture 52 that extends through the body 30 of the contact tip 24 into the internal cavity 32. The contact tip 24 is designed to direct the shield gas into the internal cavity 32 at the proximal end portion 34, and then out through the apertures 52 toward the distal end portion 36, along an exterior surface 25 of the contact tip 24. The flow characteristics of the shield gas will vary with the shape and position of the apertures 52.

Figure 4B:
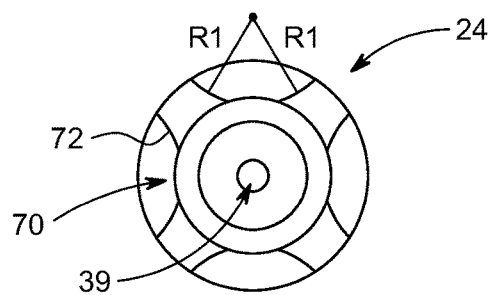
FIG. 4B is an end cross-sectional view of the contact tip, taken along line A-A of FIG. 4A, and constructed in accordance with the teachings of the present disclosure

Referring more specifically to FIGS. 4A and 4B, in one form the contact tip 24 has four apertures 52 that are equally spaced as shown. The apertures 52 in this form are each generally rectangular shaped slots that are further defined by an arcuate cut-outs 70 into the body 30 of the contact tip 24. The arcuate cut-outs 70 form guiding surfaces 72 defined by a radius R1 on both sides of the aperture 52 that lead into the internal cavity 32. The arcuate shape of the guiding surfaces 72 direct the shield gas for a desired flow characteristic out of the aperture 52 of the contact tip 24. The apertures 52 may be any shape and the guiding surfaces 72 may further be adjusted and varied to change the flow characteristics of the shield gas for various applications. The number of apertures 52 and their spacing may be further modified to achieve a desired diffused flow of the shield gas. In one form, the total cross-sectional area of the apertures 52 is approximately equal to the total cross-sectional area of the gas input to the welding cable 18 at a power pin or plug holes (not shown). In this form, the apertures 52 are designed so that the total cross-sectional area does not restrict the flow of the shield gas beyond the restriction of the power pin or plug off of the gas supply (not shown). Additionally, the arcuate cut-outs 70 may be of various size radiuses R1. The size of the arcuate cut-outs 70 however, are generally sized to balance the desired conduction heat transfer properties between the sections of the contact tip 24 and the desired gas flow characteristics created by the guiding surfaces 72 as the shield gas exits the apertures 52. In the form illustrated, the radii R1 are approximately 5/32 inches.

Referring back to FIG. 4A, the flow of the shield gas through the apertures 52 can also be modified by varying the location of the apertures 52 along the body 30 of the contact tip 24. In one form the apertures 52 are located at a principal distance 80 measured from a distal edge 82 of the apertures 52 to the distal end face 38. The principal distance 80 can advantageously be varied to adjust the flow and cooling effect of the shield gas around the contact tip 24, along with flow characteristics of the shield gas exiting the nozzle assembly 22. The principal distance 80 between the apertures 52 to the distal end face 38 is at least a minimum distance to achieve the desired flow of the shield gas and the effectiveness of the shield gas to blanket the molten welding pool during the welding operation. The location of the apertures 52 in relation to the distal end face 38 allows for modifying the desired flow characteristics for each contact tip 24, to adjust operational variables such as by way of example, a flow volume or flow pattern of the shield gas from the internal cavity 32. In one form, the principal distance 80 is at the minimum distance of approximately 0.8 inches for the shield gas to achieve laminar flow properties along the exterior surface 25 of the contact tip 24. It should be understood that the principal distance 80 varies and could be greater or less than this value for different operating conditions, such as size of the contact tip, flow volume and other parameters specific to the welding application.

The taper angle 62 may further be modified to achieve a desired wall thickness 27 of the contact tip 24, proximate the distal end portion 36. The contact tip 24 and the desired wall thickness 27 may vary based on the diameter of the exit orifice 39 or the gauge of the welding wire. The wall thickness 27 is germane for heat transfer through the contact tip 24 and in some instances may dictate the taper angle 62, for example, with a larger diameter exit orifice 39. An insufficient wall thickness 27 may lead to increased/excessive local temperatures near the distal end portion 36 and premature degradation/decreased life of the contact tip 24, and more specifically a fusing or binding of the welding wire within the contact tip 24. Therefore, to prevent premature degradation, the wall thickness 27 of the contact tip 24 defines a minimum thickness that is dependent on the duty cycle and ampere rating of the welding operation. For example, in one form, the contact tip 24 for the heavy duty application dictates the wall thickness 25 to be approximately 0.12 inches. In another form, the contact tip 24 for a medium duty application dictates the wall thickness 27 of approximately 0.08 inches. Additional modifications may include adjusting the length of the second section 59 and the third section 60 to maintain the desired wall thickness 27 for a given gauge of welding wire. For example, in an instance of using a large gauge welding wire, the exit orifice 39 must be larger and the standard taper angle 62 may result in a wall thickness 27 that is too thin. Therefore, the taper angle 62 can further be changed to maintain the desired wall thickness 27 of the contact tip 24.

Figure 5:
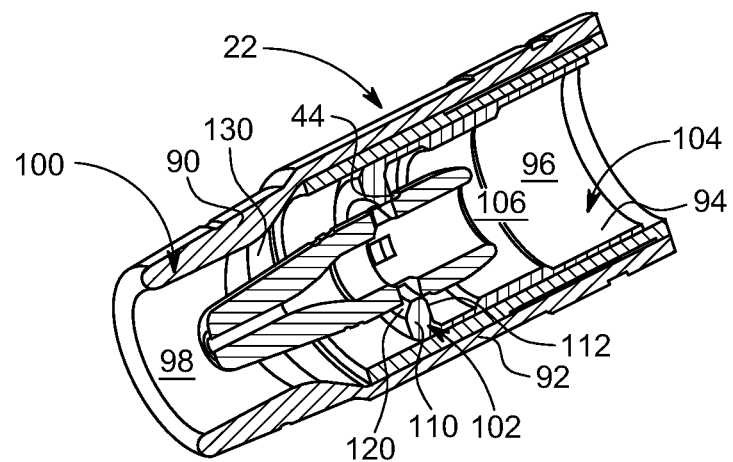
FIG. 5 is a partial perspective view of the contact tip disposed within a nozzle assembly constructed in accordance with the teachings of the present disclosure.

Referring to FIG. 5, the nozzle assembly 22 includes a nozzle body 90 that is in one form generally cylindrical, an insulator 92, and a nozzle insert 94. As shown, the nozzle body 90 extends from a proximal opening 96 to a distal opening 98. The nozzle body 90 may further include a nose portion 100 that may or may not narrow/extend inwardly to properly direct the shield gas for a given application. The nozzle insert 94 has a proximal end portion 104 and a distal end portion 102 and includes a central bore 106 extending from the proximal end portion 104 towards the distal end portion 102.

Figure 6:
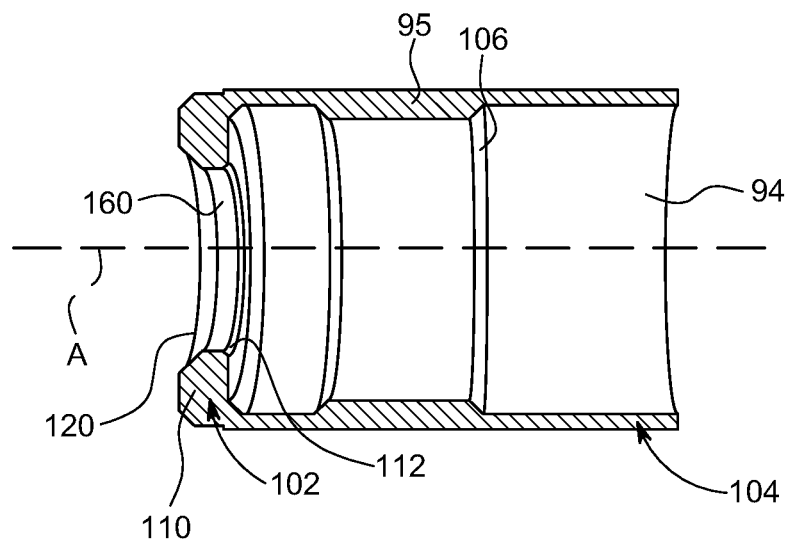
FIG. 6 is a side cross-sectional view of a nozzle insert constructed in accordance with the teachings of the present disclosure.

As shown in FIG. 6, the nozzle insert 94 includes a body 95 defining a longitudinal axis A and a central bore 106 extending from the proximal end portion 104 towards the distal end portion 102, and at its distal end portion 102 defines an internal gas diverter 110. The internal gas diverter 110 further defines a seating surface 112 toward the proximal end portion 104 of the nozzle insert 94. The seating surface 112 is chamfered in one form, for engaging the shoulder 44 of the contact tip 24. (Referring to FIG. 7, the shoulder 44 of the contact tip 24 is shown spaced apart from the seating surface 112 in order to illustrate these features in detail). As further shown, the internal gas diverter 110 defines a profiled diverter orifice 120 that extends distally from the central bore 106.

Figure 7:
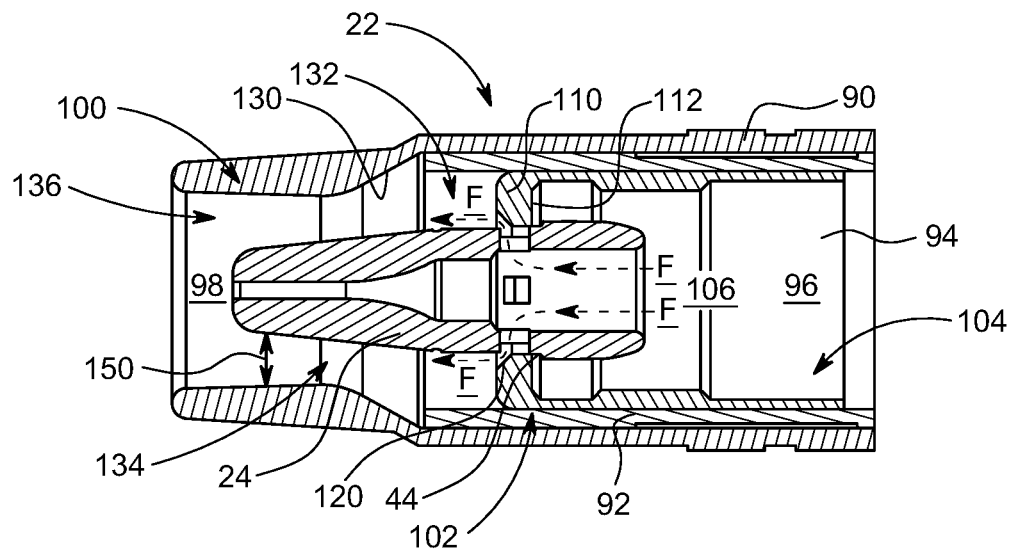
FIG. 7 is a side cross-sectional view of the contact tip and nozzle assembly of FIG. 5.

Referring to FIG. 7, the nozzle body 90 may further include an interior diverter surface 130 for further directing the shield gas exiting the apertures 52 of the contact tip 24. In this form, the shield gas flow is directed by the interior diverter surface 130 within a convergent section 132 into a throat 134, and then the shield gas enters a divergent section 136 of the nozzle body 148. In this form, the divergent section 136 has an increasing diameter from the throat 134 to a distal opening 98 of the nozzle body 90. The nozzle body 90 including both the convergent section 132 and the divergent section 136 results in flow characteristics that are more laminar when exiting the distal opening 98. In addition, the divergent section 136 directs the shield gas out the distal opening 98 to fan outward, widening the coverage of the shield gas over the weld pool during the operation of the welding gun 10. The convergent and divergent sections 132, 136 are designed to further improve and customize the flow characteristics of the shield gas for the specific welding operation. The lengths, diameters and interior geometry of the nozzle body 90 may include various permutations to allow for the shield gas to be optimized for a specific welding operation and environment. For example, the divergent section 136 may extend at a greater angle from the throat 134, further directing the shield gas into a larger fan outward of the distal opening 98. Alternately, the divergent section 136 may extend at or near the same diameter as the throat 134, thus directing the shield gas in a narrower fan exiting the distal opening 98.

As shown in FIGS. 5 and 7, the profiled diverter orifice 120 of the nozzle insert 94 extends around the apertures 52 of the contact tip 24. The gas flow, indicated by the dashed arrows F, is directed distally through the internal cavity 32 of the contact tip 24, and then radially outwards through the apertures 52. The profiled diverter orifice 120 then directs the gas flow exiting the apertures 52 distally around the exterior surface 25 of the contact tip 24 as shown.

Figure 8:
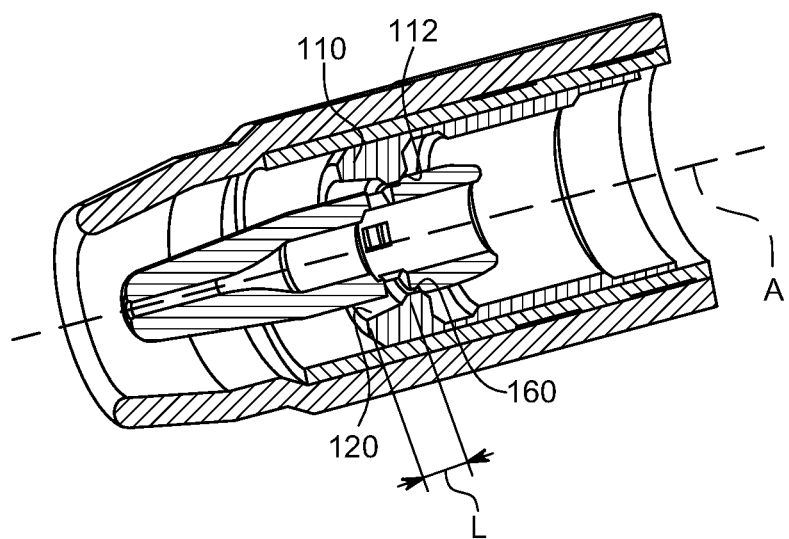
FIG. 8 is a partial perspective view of a nozzle assembly with another form of the nozzle insert constructed in accordance with the teachings of the present disclosure.

Referring to FIG. 8, the profiled diverter orifice 120 may extend various lengths L along the longitudinal axis A, from a contact seat 160 and include a variety of geometries, in addition to the chamfered configurations as illustrated herein. Alternately, the profiled diverter orifice 120 may extend at any angle that will change the direction of the shield gas to improve the flow characteristics or cooling of the contact tip 24 and surrounding nozzle assembly 22. For example, such flow characteristics may include a laminar flow along the length of the contact tip 24.

The nozzle insert 158 may be manufactured by various methods including machining or a metal injection molding process, also known as MIM. In addition, the nozzle insert may be made from various metals and alloys, for example, in one form the nozzle insert 158 is made of brass.

The present disclosure is merely exemplary in nature and, thus, variations that do not depart from the spirit of the disclosure are intended to be within the scope of the present disclosure. Such variations are not to be regarded as a departure from the scope contemplated in the present disclosure.

What is claimed is:

1. A nozzle insert for use in a welding torch to secure a contact tip to a conductor tube comprising:
    a body defining a longitudinal axis, the body having a proximal end portion, a distal end portion, and a central bore extending from the proximal end portion towards the distal end portion; and
    an internal gas diverter disposed near the distal end portion of the body, the internal gas diverter defining a seating surface facing toward the proximal end portion and a profiled diverter orifice, wherein the profiled diverter orifice is defined by a surface facing toward the distal end portion of the body, the surface extending radially outward from the longitudinal axis along a length of the surface toward the distal end portion, the length of the surface extending distally from the central bore to the distal end portion.

2. The nozzle insert according to claim 1, wherein the seating surface engages a shoulder of the contact tip and the contact tip further comprising:
    a body defining an internal cavity extending from a proximal end portion to a distal end portion;
    at least one aperture extending from an exterior portion of the body to the internal cavity;
    an exit orifice extending through the distal end portion of the body;
    a distal end face; and
    an exterior surface extending between the at least one aperture and the distal end portion of the body.

3. The nozzle insert according to claim 2, wherein the profiled diverter orifice surrounds the contact tip and the profiled diverter orifice includes geometry for directing shield gas exiting the at least one aperture of the contact tip.

4. The nozzle insert according to claim 3, wherein the profiled diverter orifice further defines a chamfer at an angle relative to the longitudinal axis of the body.

5. The nozzle insert according to claim 3, wherein the profiled diverter orifice further extends a length at an angle relative to the longitudinal axis of the body.

6. The nozzle insert according to claim 3, wherein the profiled diverter orifice extends around the at least one aperture of the contact tip.

7. The nozzle insert according to claim 3, wherein the profiled diverter orifice directs the shield gas exiting the at least one aperture of the contact tip distally around the exterior surface of the contact tip.

8. The nozzle insert according to claim 1, wherein the body of the nozzle insert further defines a plurality of threads for securing to the conductor tube.

9. The nozzle insert according to claim 8, wherein the contact tip further comprises a shoulder for engaging with the seating surface and the nozzle insert and the conductor tube further comprising a spherical tapered seat and the nozzle insert secures the contact tip into the spherical tapered seat.

10. The nozzle insert according to claim 1, wherein the nozzle insert comprises one selected from a metal, a metal alloy, or a material that is capable of withstanding the amperage applied to the welding torch and the heat generated during the use of the torch.

11. The nozzle insert according to claim 1, wherein the nozzle insert is manufactured by one of a machining operation or a metal injection molding.

12. The nozzle insert according to claim 1, wherein the body further includes a convergent section, a divergent section, and a throat section, the divergent section being disposed more proximate to the distal end portion than the convergent section and the throat section, and the convergent section being disposed more proximate to the proximal end portion than the divergent section and the throat section.

13. The nozzle insert according to claim 12, wherein the body further includes a interior diverter surface disposed in the convergent section that directs shield gas into the throat section.

14. The nozzle insert according to claim 12, wherein the convergent section has a first diameter and the throat section has a second diameter, the first diameter being greater than the second diameter.

15. The nozzle insert according to claim 14, wherein the divergent section includes a third diameter that increases in size from the throat section to a distal opening at the distal end portion of the body.

* * * * *